US012602206B2

(12) United States Patent
Havewala et al.

(10) Patent No.: US 12,602,206 B2
(45) Date of Patent: Apr. 14, 2026

(54) SYSTEMS AND METHODS FOR CODE GENERATION

(71) Applicant: SAP SE, Walldorf (DE)

(72) Inventors: Anahita Havewala, Hayward, CA (US); Jesus Manuel Sanchez Martinez, San Francisco, CA (US)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 18/485,666

(22) Filed: Oct. 12, 2023

(65) Prior Publication Data

US 2025/0123810 A1 Apr. 17, 2025

(51) Int. Cl.
*G06F 8/30* (2018.01)

(52) U.S. Cl.
CPC .................................... *G06F 8/30* (2013.01)

(58) Field of Classification Search
CPC ....................................................... G06F 8/30
See application file for complete search history.

(56) References Cited

U.S. PATENT DOCUMENTS

| | | | | |
|---|---|---|---|---|
| 10,785,128 B1 * | 9/2020 | Bawcom | .................. | G06F 8/38 |
| 12,367,337 B2 * | 7/2025 | Gutierrez | ............. | G06F 16/213 |
| 2018/0152370 A1 * | 5/2018 | Hartley | .............. | H04L 41/0846 |
| 2023/0004431 A1 * | 1/2023 | Lee | ..................... | H04L 41/0816 |
| 2024/0385818 A1 * | 11/2024 | Silverstein | .......... | G06F 11/3419 |
| 2025/0005260 A1 * | 1/2025 | Mansour | ................. | G06F 9/541 |
| 2025/0111323 A1 * | 4/2025 | Epstein Koch | ........ | G06N 3/045 |

FOREIGN PATENT DOCUMENTS

WO WO-2024205899 A1 * 10/2024 ........... G06F 21/577

* cited by examiner

*Primary Examiner* — Phillip H Nguyen
(74) *Attorney, Agent, or Firm* — Fountainhead Law Group, PC

(57) ABSTRACT

Embodiments of the present disclosure include techniques for generating code. Input code is received from a user. The code may not be conforming to a particular policy. The input code may be used to retrieve corresponding policies relevant for the code. In some embodiments, the input code may have a particular version, and a schema corresponding to the code version may be retrieved. The input code, policy, and schema may be input to a large language model to generate modified code conforming to the policy and the schema, for example.

17 Claims, 4 Drawing Sheets

SYSTEMS AND METHODS FOR CODE GENERATION

BACKGROUND

The present disclosure relates generally to generating computer code and, in particular, to systems and methods for generating computer code for generating infrastructure.

In recent years, cloud infrastructure has become an integral part of the modern enterprise technology stack. However, reliance on cloud resources at the infrastructure layer of the technology stack is accompanied by a growing number of security concerns. One such concern is the widespread reliance on textual security policies which are primarily designed for human consumption. These policies often fail to provide an actionable, automated solution to enforce security rules across the entire infrastructure, leading to potential gaps and vulnerabilities in the infrastructure. Furthermore, public cloud providers and software providers may update software libraries more frequently than these security policies are updated. As a result, developers may be pressured to update security policies, update corresponding code, and maintain these updated versions. However, meeting these requirements is a manual process that is both time consuming and error prone. Accordingly, there is a pressing need for a solution to overcome the challenges of writing and maintaining secure infrastructure code.

The present disclosure addresses these and other challenges and is directed to techniques for generating computer code and providing secure infrastructure code, for example.

DETAILED DESCRIPTION

Described herein are techniques for generating computer code. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
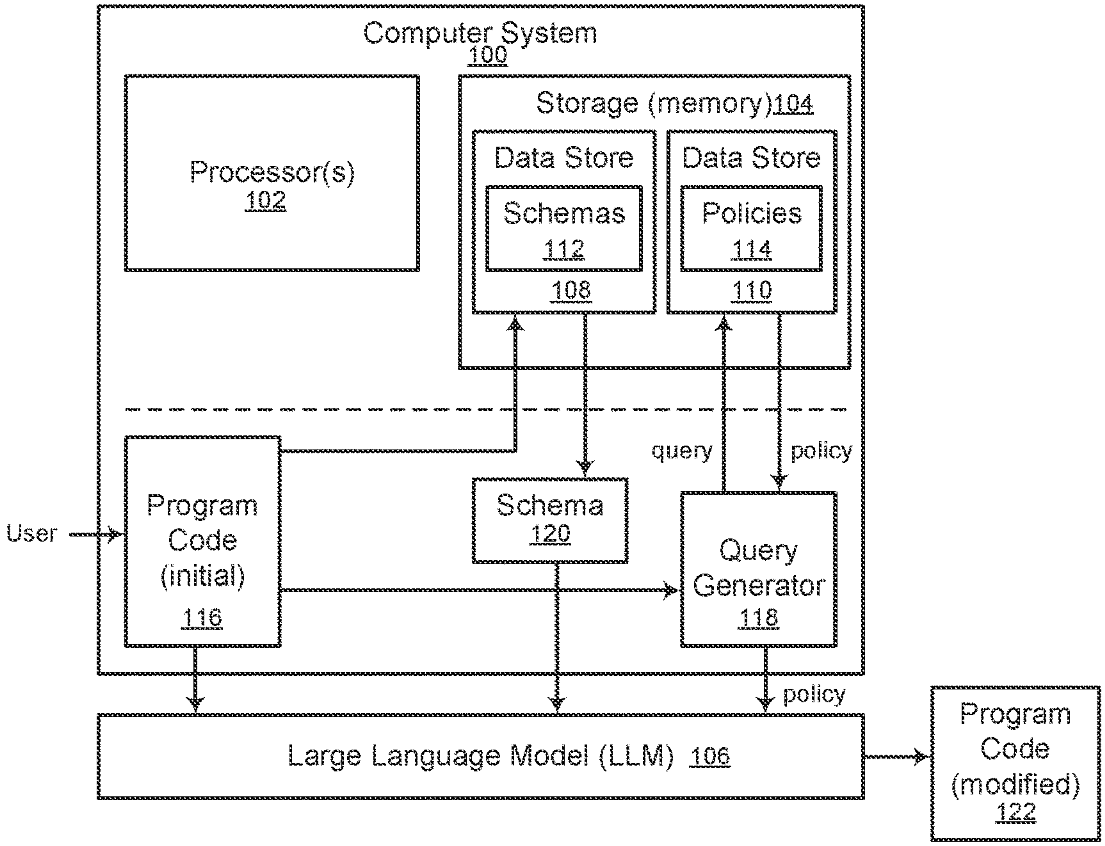
FIG. 1 illustrates a system for generating code according to an embodiment.

FIG. 1 illustrates a system for generating code according to an embodiment. As shown, computer system 100 includes one or more processors 102, storage (memory) 104, and query generator 118. Storage 104 is illustrated here as including a data store 108 of schemas 112 and a data store 110 of policies 114. In some example embodiments, data store 110 is a vector data store as illustrated in example shown below. In some embodiments, policies 114 are security policies, for example. While data store 108 and data store 110 are shown separately in FIG. 1, one of ordinary skill in the art will understand that they can be implemented in any number of different ways. For example, each data store can be implemented on a different system, database, or combination thereof. Computer system 100 is configured to communicate with Large Language Model (LLM) 106. GPT-4 by OpenAI is one example of an LLM. The system may be configured to receive program code 116 from a user. For example, a user may send program code 116 to the system as part of a code submission to a version control system (not shown) communicatively coupled to computer system 100.

Features and advantages of the present disclosure include storing a plurality of security policies 114 in a data store 110. When code 116 is received, it may be forwarded to query generator 118. Query generator 118 receives code 116 and generates a query to a data store based on code 116. Data store 110 comprising a plurality of policies 116 governing the structure of the program code 116. However, program code 116 may not be compliant with policies 116, for example. In some example embodiments described in more detail below, policies 116 may be converted to embeddings using a model. Elements of code 116 may be input to the model to produce query terms, which may be used to lookup the stored embeddings and return text based policies, for example. Advantageously, the query returns security policies associated with program code 116, which may be used to generate security compliant code. For instance, program code 116 and security policies 114 may be provided to LLM 106 to produce second program code 122. The second program code 122 may be a modified version of the initial program code 116. Modifications to the program code 122 may include changing program code 116 so that second program code 122 conforms to security policies 114. For example, as mentioned above, initial program code 116 may not conform with one or more of the security policies 114 that may be associated with code 116. As a specific example, if program code 116 is infrastructure as code (IaC), program code 116 may specify infrastructure (e.g., cloud infrastructure), but may not be compliant with certain security policies for the infrastructure resources. A prompt to an LLM may include program code augmented with certain security policies 114 so that the LLM generates new code 122 that performs the same tasks as initial code 116, but further is compliant with security policies 114, for example.

In some situations, LLM 106 may not be trained to generate a particular version program code 116. For example, if program code 116 is written in a newly released version that LLM 106 has not been trained on, or if the version of code 116 is simply not supported by LLM 106, the generated code 122 may not work. In some embodiments, features and advantages of the present disclosure may include storing schemas 112 in a data store 108. The schemas may be for a particular version that the program code 116 should adhere to. When program code 116 is received by the system, schemas associated with code 116 may be retrieved based on the code 116. For example, if code 116 is written in a particular language having a particular version with particular programming elements, schemas associated the language, version, and elements may be retrieved from data store 108. The schema 120 may be included with code 116 and security policies 114 and inputted to LLM 106 so that generated program code 122 conforms to both the schema associated with code 116 and security policies 114 applicable to code 116. Accordingly, program code 122 may execute using the same version as code 116 with the addition of being compliant with desired security policies.

Figure 2:
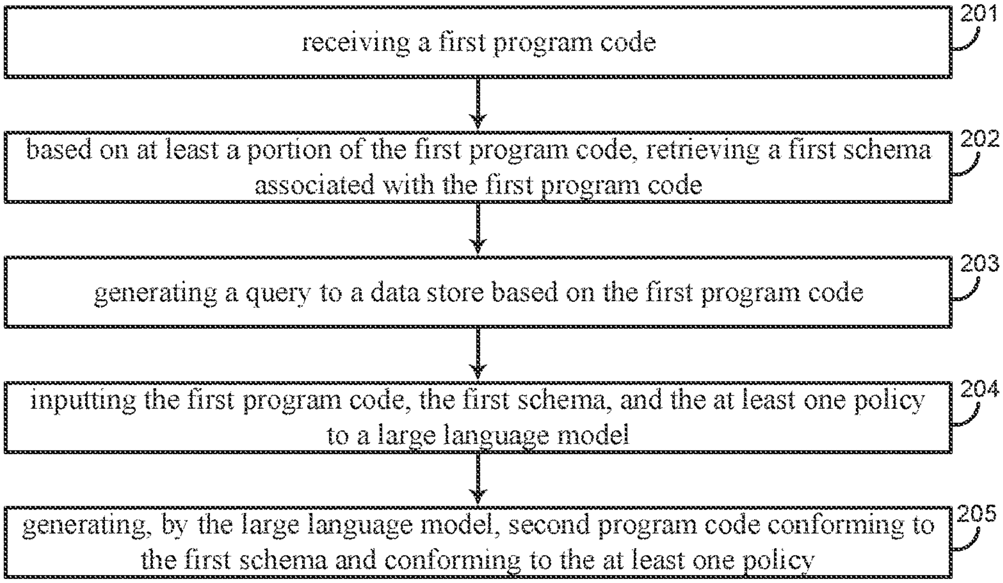
FIG. 2 illustrates a method for generating code according to an embodiment.

FIG. 2 illustrates a method for generating code according to an embodiment. At 201, program code is received (e.g., from a user). At 202, a first schema associated with the first program code is retrieved based on at least a portion of the first program code. At 203, a query is generated to a data store based on the first program code. The data store comprises a plurality of policies governing the structure of the first program code. In certain embodiments, the first program code does not conform with policy relevant to the program code. The policies may be security policies, for example, and the program code may not be compliant with the security policies. The query returns one or more policies associated with the first program code. At 204, the first program code, the first schema, and at least one policy are input to a large language model (LLM). In certain embodiments, the large language model (LLM) is not trained with the first schema. At 205, second program code is generated by the large language model (LLM), where the second program code conforms to the first schema and conforms to the at least one policy.

Figure 3:
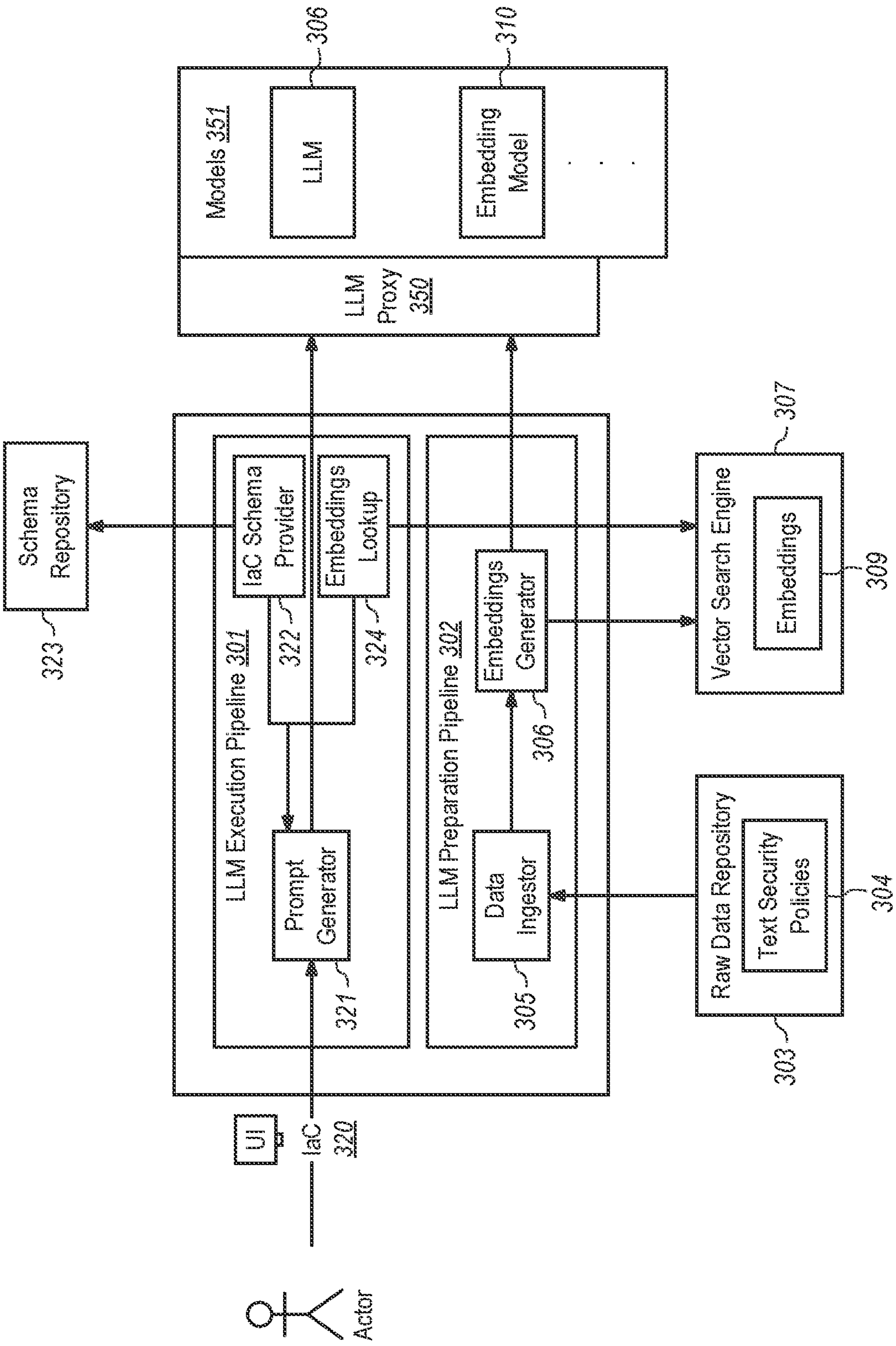
FIG. 3 illustrates an example of generating infrastructure code to specify infrastructure in a cloud computing environment according to an embodiment.

FIG. 3 illustrates an example of generating infrastructure code to specify infrastructure in a cloud computing environment according to an embodiment. In this example, an infrastructure may be created by entering infrastructure-as-code (IaC) 320 in a user interface (UI). The present architecture automatically generates secure code that is up to date on the current version and compliant with security policies. An LLM preparation pipeline 302 processes policies for fast and efficient retrieval. An LLM execution pipeline 301 receives IaC code 320 and generates modified IaC code compliant (conforming to) the policies. Initially, text based security policies 304 for an organization are stored in a data repository 303. An example text security policy is as follows:

Sub Header: "security policy—##Ensure encryption in transit is configured for object storage"

Body: "All access to object storage services MUST be performed using an encrypted connection (HTTPS) —TLS v1.2 or higher—to ensure that the transferred data cannot be intercepted by unauthorized third parties. Data in transit encryption is mandatory for many industry standards and regulatory compliance requirements and therefore also a MUST.

Internal & External References

NIST Cybersecurity Framework: PR.DS-2

NIST SP 800-53 Rev 5.1: SC-8"

In some cases, security policies comprise headers, one or more sub-headers, and bodies. The sub-headers typically include information about infrastructure resources the policy is associated with (e.g., storage). The body typically describes the security policy. The policies may specify configuration details or operating details for the infrastructure that should be followed to be compliant with the policy. In some example embodiments, second level headings (subheadings) below a main heading from a text based security policy document may be converted to embeddings as described in more detail below.

Data Ingestor 305 retrieves text policies 304 from repository 303 and sends the policies to an embeddings generator 306. In this example, the security policies are converted to embeddings for storage and fast retrieval in a vector search engine data store 307. The text security policies 304 are sent from embeddings generator 306 to an embedding model 310 in an LLM 351 through an LLM proxy 350. In some embodiments, text security policies input to the embedding model 310 may include overlapping portions of other text security policies, for example, to improve performance of the embeddings. LLM proxy 350 is an abstraction and interface that exposes LLM to inputs from external programs.

Embeddings 309 for the policies are stored in the vector search engine database 307. One example of embeddings is text-embedding-ada-002 from OpenAI. Text-embedding-ada-002 is an embedding model that combines the capabilities of five previous models for text search, text similarity, and code search. Embeddings are numerical representations of concepts that allow computers to understand the relationships between those concepts. They are often used in tasks such as searching, clustering, recommendation, anomaly detection, diversity measurement, and classification. Embeddings consist of vectors of real or complex integers with floating-point arithmetic, and the distance between two vectors indicates the strength of their relationship. Generally, closer distances indicate a stronger connection, while farther distances indicate a weaker one. An embedding model may be distinct from the LLM model used to generate code, for example.

IaC code is processed by pipeline 301 as follows. IaC code is entered into a UI at 320. The following is an example of IaC code:

GCP Provider version 2

```
resource "google_storage_bucket_object" "picture" {
  name = var.bucket_name
  source = "/images/nature/garden-tiger-moth.jpg"
  bucket = "image-store"
}
```

Code typically contains certain descriptor elements. Descriptor elements may describe structural aspects of code that correspond to policies. In this example, IaC code includes a technical name of the resource ("google_storage_bucket_object"). Descriptor elements, such as resource descriptors in IaC, may be extracted from the code and used to query polices. For example, portions of the code may be sent to embedding model 310, which may return one or more tokens (e.g., words corresponding to the one or more technical resources) associated with the descriptor elements of the input code 320. In this case, embedding model 310 may return "storage," "google cloud," and "buckets." These tokens may then be used to in a query, which is sent to vector search engine 307 to lookup corresponding embeddings and return the text based policies used to generate to those embeddings. IaC code 320 may be sent to embeddings lookup 324 to perform some or all of the functions described above and return text based security policies for the IaC code 320.

Additionally, in this example, IaC schema provider 322 retrieves a schema describing the IaC code 320 from schema repository 323. The following is an example of a schema according to one embodiment:

The following arguments are supported:

bucket—(Required) The name of the containing bucket.

name—(Required) The name of the object. If you're interpolating the name of this object, see output name instead.

metadata—(Optional) User-provided metadata, in key/value pairs.

One of the following is required:

content—(Optional, Sensitive) Data as string to be uploaded. Must be defined if source is not. Note: The content field is marked as sensitive. To view the raw contents of the object, please define an output.

source—(Optional) A path to the data you want to upload. Must be defined if content is not.

cache_control—(Optional) Cache-Control directive to specify caching behavior of object data. If omitted and object is accessible to all anonymous users, the default will be public, max-age=3600 content disposition—(Optional) Content-Disposition of the object data.

content encoding—(Optional) Content-Encoding of the object data.

IaC schemas in schema repository 323 may be stored in a structured format, which may be parsed and retrieved for different input code, for example. One example structured format for storing schemas is a mark down file format, which is a text file created using one of several possible dialects of the Markdown language. It uses plain text formatting but contains inline text symbols that specify how to format the text (e.g., *bold* for bold text, or other markups for italics, indentation, headers, etc.). In one embodiment, the schema information is pulled from public documentation/sources about the resource such as on Github, which is available in Markdown format, for example.

Next, prompt generator 321 inputs the IaC code 320 as an LLM 306 input augmented by the text based policies relevant to code 320 and schema for code 320 to fine tune and constrain the output. LLM 306 receives and processes the IaC code 320, the associated schema, and the associated security policies, and produces modified IaC code that performs the same functions and further conforms to the associated schema and conforms to the associated security policies.

Figure 4:
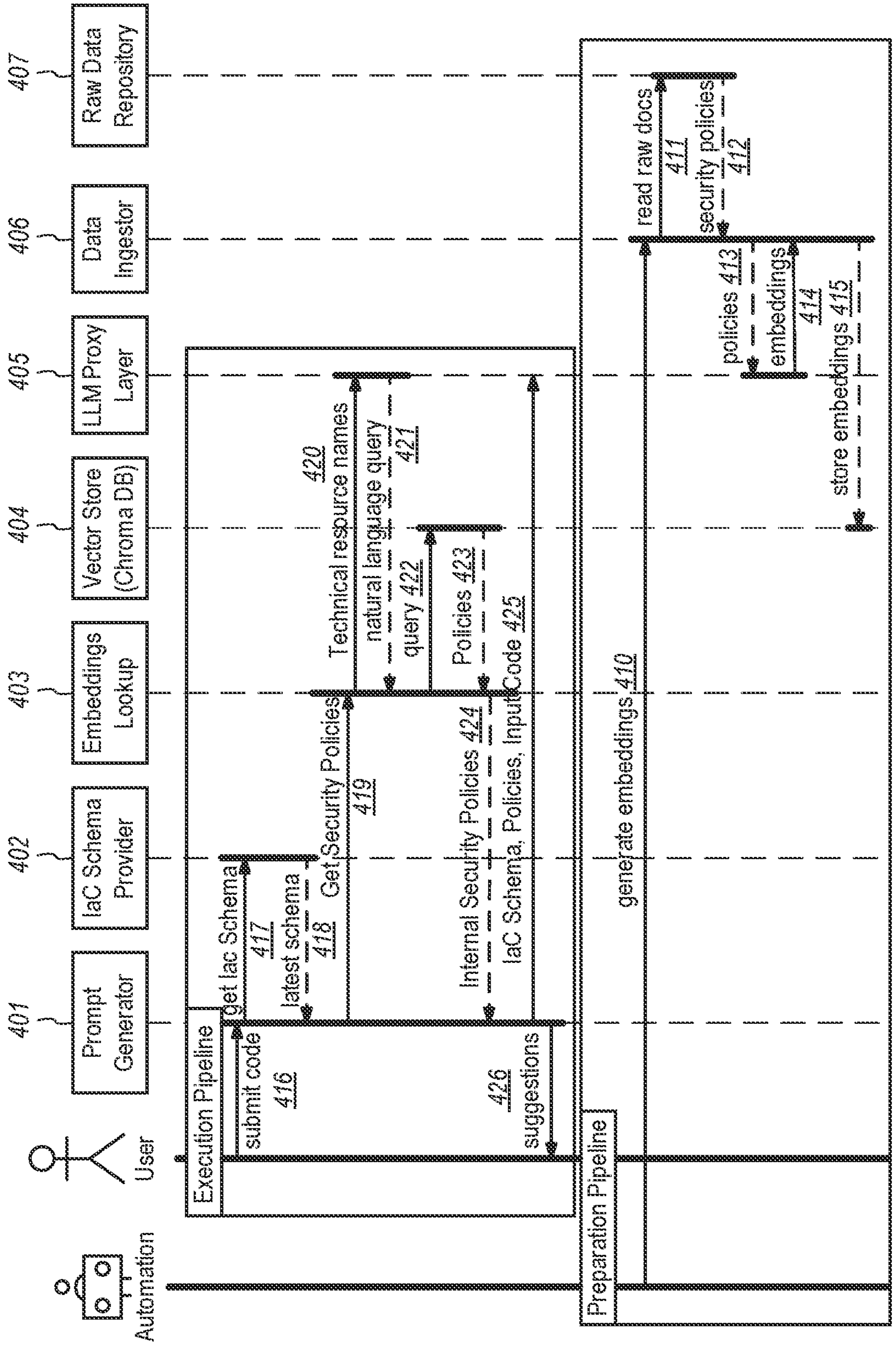
FIG. 4 illustrates a sequence flow diagram for an example of generating infrastructure code according to an embodiment.

FIG. 4 illustrates a sequence flow diagram for an example of generating infrastructure code according to an embodiment. A process of generating security compliant code from non-compliant code may start at 410 with the issuance of command to start generating embeddings. At 411, data ingestor 406 reads raw text based security polices from raw data repository 407 to receive the policies at 412. At 413, the polices are sent to LLM proxy layer 405 and converted to embeddings by an embedding model. The embeddings are received at 414 by the data ingestor 406 and stored in vector data store 404 (e.g., ChromaDB) at 415. The embeddings are now available to receive queries and return corresponding text based security policies.

At 416, a user submits IaC code to a prompt generator 401. Prompt generator 401 uses the input code to get a corresponding IaC schema at 417 using IaC schema provider 402. In this example, a latest version schema is returned at 418. At 419, prompt generator 401 uses embeddings lookup 403 to get security policies for the input code. At 420, embeddings lookup 403 sends technical resource names to LLM proxy layer 405 to access the embeddings model used to generate the embeddings in the vector store 404. LLM proxy layer 405 returns a natural language query at 421 for looking up embeddings based on the technical resource names. At 422, the query is sent to vector store 404, and the vector store uses the query to return text based security policies at 423. At 424, the text based security polices are returned to the prompt generator 401. At 425, the IaC schema, policies, and input code are sent to LLM proxy layer 405 for processing by an LLM. At 426, LLM proxy layer 405 returns modified IaC code to prompt generator 401 for display to the user.

Figure 5:
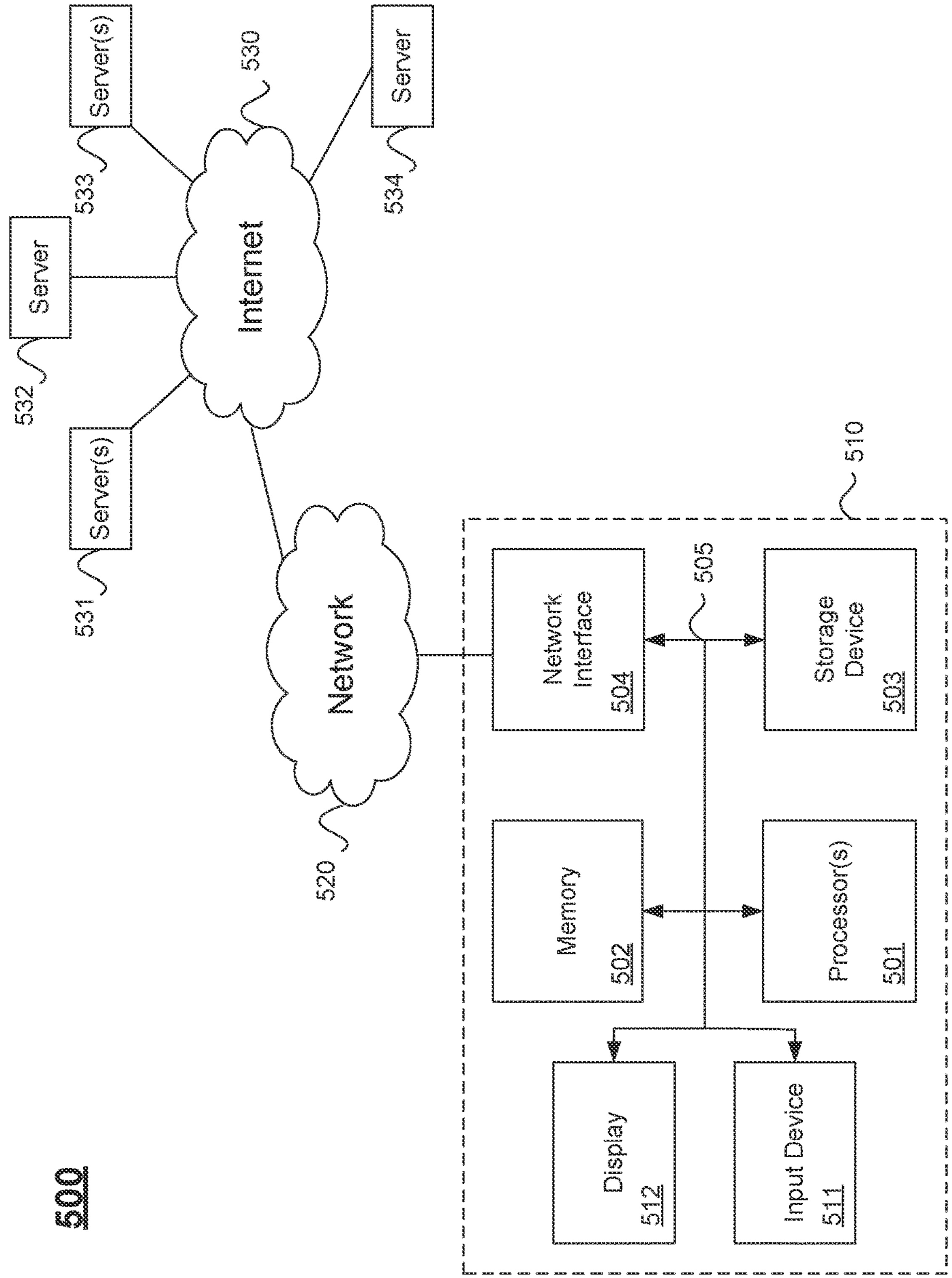
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform methods as described herein and in the following examples. In another embodiment, the present disclosure includes a non-transitory computer-readable medium storing computer-executable instructions that, when executed by at least one processor, perform the methods as described herein and in the following examples.

In one embodiment, the present disclosure includes a method of generating code comprising: receiving a first program code; based on at least a portion of the first program code, retrieving a first schema associated with the first program code; generating a query to a data store based on the first program code, the data store comprising a plurality of policies governing the structure of the first program code, the query returning at least one policy associated with the first program code; inputting the first program code, the first schema, and the at least one policy to a large language model; and generating, by the large language model, second program code conforming to the first schema and conforming to the at least one policy.

In one embodiment, the large language model is not trained with the first schema.

In one embodiment, the first program code does not conform with the at least one policy.

In one embodiment, the policies are embeddings generated by a second large language model based on text based policies, the method further comprising inputting one or more elements of the first program code into the second large language model, the second large language model returning a plurality of tokens associated with the one or more elements of the first program code, wherein the query comprises a plurality of tokens.

In one embodiment, the first program code is infrastructure code to specify infrastructure in a cloud computing environment.

In one embodiment, the one or more elements of the first program code are one or more technical resources of the cloud computing environment.

In one embodiment, the plurality of tokens is a plurality of words corresponding to the one or more technical resources.

In one embodiment, the plurality of policies are security policies, wherein the plurality of security policies governing the structure of the first program code are stored in the data store as security policy embeddings, and wherein, prior to receiving the first program code, the method further comprising: receiving a plurality of security policies for an organization; converting the plurality of security policies into a plurality of security policy embeddings; and storing the plurality of security policy embeddings in the data store.

In one embodiment, the plurality of security policies is converted into the plurality of security policy embeddings by the large language model.

In one embodiment, the plurality of security policies converted into the plurality of security policy embeddings are second level headings of a text based security policy.

In one embodiment, the first schema is retrieved from a data store comprising structured schema documents describing a particular version of the first program code.

In one embodiment, the structured schema documents are in a mark down file format.

In one embodiment, the data store is a vector data store.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of generating code comprising:
- receiving a first program code;
- based on at least a portion of the first program code, retrieving a first schema associated with the first program code;
- generating a query to a data store based on the first program code, the data store comprising a plurality of policies governing the structure of the first program code, the query returning at least one policy associated with the first program code;
- inputting the first program code, the first schema, and the at least one policy to a large language model; and
- generating, by the large language model, second program code conforming to the first schema and conforming to the at least one policy,
- wherein the policies are embeddings generated by a second large language model based on text based policies, the method further comprising inputting one or more elements of the first program code into the second large language model, the second large language model returning a plurality of tokens associated with the one or more elements of the first program code, wherein the query comprises a plurality of tokens.

2. The method of claim 1, wherein the large language model is not trained with the first schema.

3. The method of claim 1, wherein the first program code does not conform with the at least one policy.

4. The method of claim 1, wherein the first program code is infrastructure code to specify infrastructure in a cloud computing environment.

5. The method of claim 4, wherein the one or more elements of the first program code are one or more technical resources of the cloud computing environment.

6. The method of claim 5, wherein the plurality of tokens is a plurality of words corresponding to the one or more technical resources.

7. The method of claim 1, wherein the plurality of policies are security policies, wherein the plurality of security policies governing the structure of the first program code are stored in the data store as security policy embeddings, and wherein, prior to receiving the first program code, the method further comprising:
- receiving a plurality of security policies for an organization;
- converting the plurality of security policies into a plurality of security policy embeddings; and
- storing the plurality of security policy embeddings in the data store.

8. The method of claim 7, wherein the plurality of security policies is converted into the plurality of security policy embeddings by the large language model.

9. The method of claim 8, wherein the plurality of security policies converted into the plurality of security policy embeddings are second level headings of a text based security policy.

10. The method of claim 1, wherein the first schema is retrieved from a data store comprising structured schema documents describing a particular version of the first program code.

11. The method of claim 10, wherein the structured schema documents are in a mark down file format.

12. The method of claim 1, wherein the data store is a vector data store.

13. A computer system comprising:

at least one processor;

at least one non-transitory computer-readable medium storing computer-executable instructions that, when executed by the at least one processor, cause the computer system to perform a method of connecting computer systems comprising:

receiving first infrastructure-as-code (IaC) program code;

based on at least a portion of the first IaC program code, retrieving a first schema associated with the first program code;

generating a query to a data store based on the first IaC program code, the data store comprising a plurality of security policy embeddings, the query returning text based security policies corresponding to security policy embeddings associated with the first IaC program code, wherein the first program code does not conform with the text based security policies; and inputting the first IaC program code, the first schema, and the at least one text based security policy to a large language model;

generating, by the large language model, second IaC program code conforming to the first schema and conforming to the at least one text based security policy, wherein the security policy embeddings are generated by a second large language model based on the text based security policies, the method further comprising inputting one or more resource descriptors from the first IaC program code into the second large language model, the second large language model returning a plurality of tokens associated with the one or more resource descriptors of the first IaC program code, wherein the query comprises a plurality of tokens.

14. A non-transitory computer-readable medium storing computer-executable instructions that, when executed by at least one processor, perform a method of connecting computer systems, the method comprising:

receiving first program code;

based on at least a portion of the first program code, retrieving a first schema associated with the first program code;

generating a query to a data store based on the first program code, the data store comprising a plurality of policies governing the structure of the first program code, the query returning at least one policy associated with the first program code;

inputting the first program code, the first schema, and the at least one policy to a large language model; and generating, by the large language model, second program code conforming to the first schema and conforming to the at least one policy, wherein the large language model is not trained with the first schema, wherein the first program code does not conform with the at least one policy, wherein the policies are embeddings generated by a second large language model based on text based policies, the method further comprising inputting one or more elements of the first program code into the second large language model, the second large language model returning a plurality of tokens associated with the one or more elements of the first program code, wherein the query comprises a plurality of tokens.

15. The non-transitory computer-readable medium of claim 14, wherein the first program code is infrastructure code to specify infrastructure in a cloud computing environment.

16. The non-transitory computer-readable medium of claim 15, wherein the one or more elements of the first program code are one or more technical resources of the cloud computing environment.

17. The non-transitory computer-readable medium of claim 16, wherein the plurality of tokens is a plurality of words corresponding to the one or more technical resources.

* * * * *